UNITED STATES PATENT OFFICE.

WILHELM BERCHELMANN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

GREENISH-BLUE WOOL-DYE.

1,045,805. Specification of Letters Patent. Patented Dec. 3, 1912.

No Drawing. Application filed July 2, 1912. Serial No. 707,336.

*To all whom it may concern:*

Be it known that I, WILHELM BERCHELMANN, doctor of philosophy, chemist, citizen of the German Empire, residing at Vohwinkel, near Elberfeld, Germany, have invented new and useful Improvements in Greenish-Blue Wool-Dye, of which the following is a specification.

I have found that a new and valuable dye can be obtained by treating 5-nitro-1.4-diaminoanthraquinone

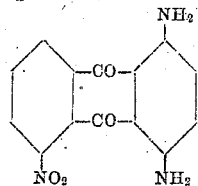

with epichlorhydrin

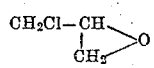

and treating the product thus produced with a sulfonating agent. The new dye having most probably the formula:

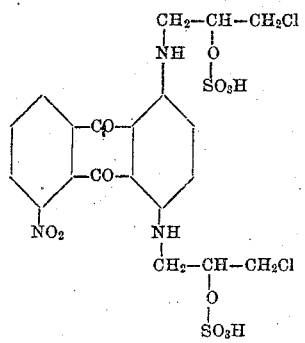

is after being dried and pulverized in the shape of its alkaline salt a bluish powder soluble in water with a blue color; and soluble in concentrated sulfuric acid with a brown color which after a short time changes into red; and dyeing wool a brilliant greenish-blue shade distinguished by its fastness to light.

In order to illustrate the new process more fully the following example is given, the parts being by weight:—A mixture of 20 parts of 5-nitro-1-4-diaminoanthraquinone, 28 parts of a 90 per cent. formic acid and 100 parts of epichlorhydrin is stirred at from 30-35° C. until it has assumed a greenish-blue coloration. The new product thus obtained separates. When the quantity of the precipitate does no longer increase, it is filtered off, washed with water, dried and treated with hot nitrobenzene. 10 parts of the product are then introduced into 200 parts of fuming sulfuric acid (5 per cent. $SO_3$) and the mixture is stirred at 10-15° C. until a sample is soluble in water. It is then poured on ice water, the dye is salted out with potassium chlorid and dried.

I claim:—

As a new product the sulfonated condensation product having most probably the formula:

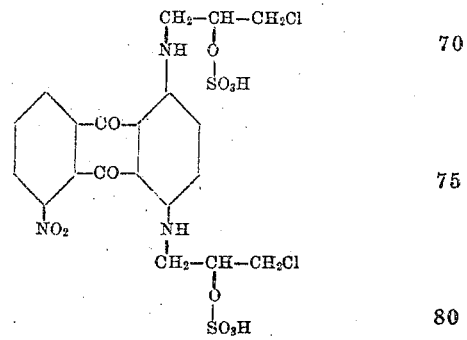

which dye is after being dried and pulverized in the shape of its alkaline salt a bluish powder soluble in water with a blue and in concentrated sulfuric acid with a brown coloration which after a short time changes into red and dyeing wool greenish-blue shades fast to light, substantially as described.

In testimony whereof I have hereunto set my hand in the presence of two subscribing witnesses.

WILHELM BERCHELMANN. [L. S.]

Witnesses:
HELEN NUFER,
CHAS. J. WRIGHT.